United States Patent [19]

Østergaard

[11] 4,113,150
[45] Sep. 12, 1978

[54] DISPENSER FOR GROUND COFFEE AND OTHER POWDERED PRODUCTS

[76] Inventor: Steen Østergaard, No. 68 Kildeskovsvej, 2820 Gentofte, Denmark

[21] Appl. No.: 754,696

[22] Filed: Dec. 27, 1976

[51] Int. Cl.² ............................................. G01F 11/18
[52] U.S. Cl. .................................................... 222/243
[58] Field of Search ............... 222/199, 200, 243, 244, 222/246, 537, 559, 561, 453, 361, 363, 444, 450, 451

[56] References Cited

U.S. PATENT DOCUMENTS

| 448,275 | 3/1891 | Stowell | 222/451 X |
|---|---|---|---|
| 1,341,174 | 5/1920 | Ingram et al. | 222/243 |
| 1,471,621 | 10/1923 | McCord | 222/361 X |
| 2,240,030 | 4/1941 | Bobrsck et al. | 222/361 X |
| 2,782,962 | 2/1957 | Mercer | 222/243 X |
| 3,892,337 | 7/1975 | Neumann | 222/199 |

*Primary Examiner*—Joseph F. Peters, Jr.
*Assistant Examiner*—Norman L. Stack, Jr.
*Attorney, Agent, or Firm*—Lane, Aitken, Dunner & Ziems

[57] ABSTRACT

In a dispenser for powdered products, the bottom wall of the storage container comprises a stationary outlet spout forming a measuring chamber and cooperating with a horizontally displaceable valve member having upper and lower walls to obstruct the upper and lower ends of the spout in respective extreme positions of the valve member. The upper wall of the valve member is integral with an agitator member that is slidable along an inclined section of the bottom wall of the container.

1 Claim, 2 Drawing Figures

DISPENSER FOR GROUND COFFEE AND OTHER POWDERED PRODUCTS

FIELD AND BACKGROUND OF THE INVENTION

The invention relates to a dispenser for powdered products, particularly ground coffee, comprising a storage container and a measuring chamber operating like a sluice for delivering charges of the powder.

The extensive use of automatic devices for brewing a few cups of coffee at a time has created a great demand for dispensers of the type specified. Such dispensers must be of a rather simple or uncomplicated design to reduce the manufacturing cost but, nevertheless, they should be at least substantially aroma tight and be easy to operate, and a further condition is that the measuring chamber is, with certainty, filled with the predetermined quantity of coffee powder in spite of the well known liability of this material to stick.

SUMMARY OF THE INVENTION

The above objects are achieved by the dispenser of the invention, according to which the measuring chamber is formed by an outlet spout that is integral with the bottom wall of the storage container and is operatively associated with a valve member which is displaceable between a projected position and a retracted position and comprises upper and lower walls, of which the upper one forms an obstruction between the container space and the spout when the valve member is displaced toward the retracted position, while the lower wall, in the same situation, does not obstruct the discharge end of the spout, the valve member being integral with an agitator operating along the bottom wall of the container to promote the movement of the powder toward the outlet spout.

In the projected position of the valve member, the container space is in open communication with the outlet spout serving as the measuring chamber which in this position of the valve member is closed toward the atmosphere by the lower wall of this member. The operation requires no more than a simple pressure to move the valve member, normally against the force of a returning spring, to a position in which the lower end of the spout is no more obstructed so that the measured quantity of powder therein will be discharged by gravity. At the same time the upper wall of the valve member forms a temporary obstruction between the measuring chamber and the container space so that this space remains closed toward the atmosphere. When the pressure upon the closure member is released, this member returns to its starting position, and by this motion the agitator contributes to re-filling the measuring chamber with powder so that a next charge can immediately be released by a renewed pressure on the valve member. However, this valve member may be associated with a coin-freed mechanism which prevents any displacement of the member until a coin has been inserted.

BRIEF DESCRIPTION OF THE DRAWING

A preferred embodiment of the inventive dispenser for ground coffee is illustrated somewhat diagrammatically on the drawing, in which.

DETAILED DESCRIPTION OF THE PREFERRED EMBODIMENT

The storage container of the dispenser comprises a bottom structure 1 and a circumferential wall 2 which at its upper end may have an opening with a cover permitting the container space to be filled-up with ground coffee. Both parts of the container may consist of a suitable plast material, and so may also the valve or closure member 3 of the dispenser.

Figure 1:
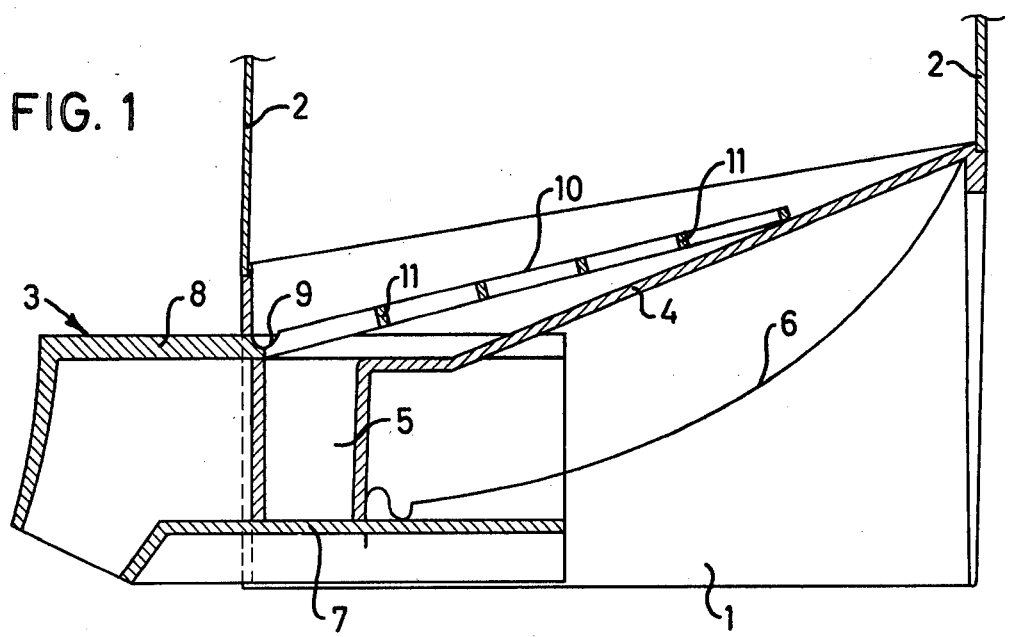
FIG. 1 is an axial section through the lower portion of the dispenser with its valve member in the projected position.

The bottom wall 4 of the container is integral with an outlet spout 5, serving as a measuring chamber, and inclines downwardly toward this spout. A leaf spring 6 urges the valve member 3 toward its projected position, FIG. 1, in which that end of the spring 6 which is connected to the valve member abuts the spout and thereby defines said projected position. As appears, with this position of the valve member, the container space above the bottom wall is in open communication with the measuring chamber formed by the spout, while a lower wall 7 incorporated in the valve member obstructs the lower end of the spout.

Figure 2:
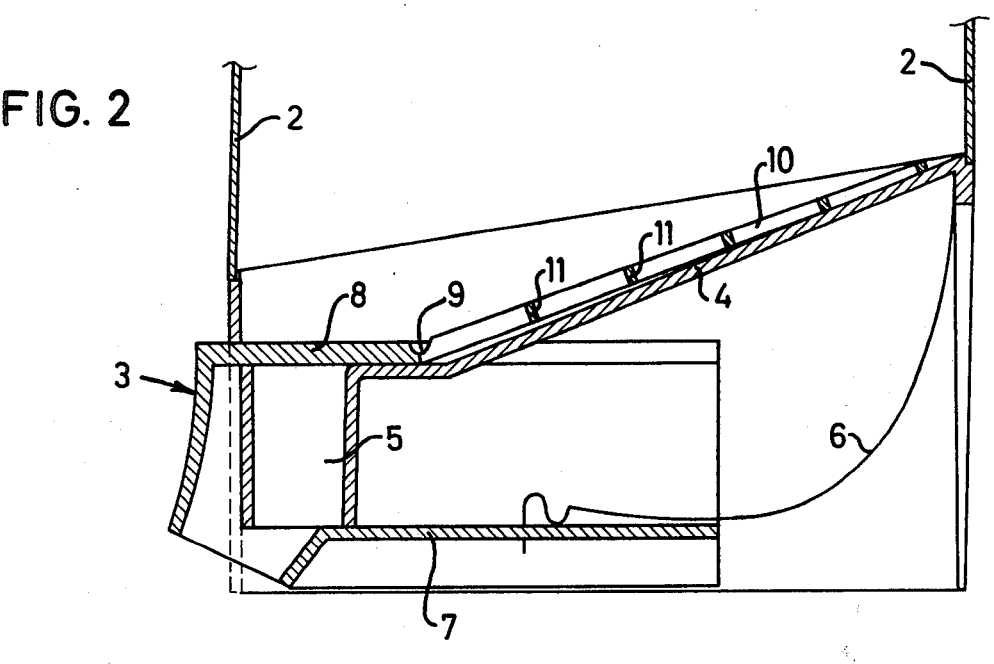
FIG. 2 is a similar illustration with the valve member pressed back into its retracted position.

When the valve member 3 is pressed back, the lower end of the spout 5 is not obstructed by the wall 7, see FIG. 2, while the upper wall 8 of the valve member obstructs the upper end of the spout toward the container space.

Through a hinge point 9 the upper wall 8 is in connection with one end of an agitator 10 which may be of ladder formation with steps or rungs 11, the other end of the agitator resting slidably on the inclined bottom wall 4 of the container. When the valve member 3 is released in the FIG. 2 position so as to be displaced forwardly by the spring 6, the agitator moves forwardly close to the bottom wall 4 and promotes the movement of the coffee powder toward the entrance to the spout 5 which will thereby become filled as the wall 8 approaches the FIG. 1 position.

What is claimed is:

1. A dispenser for ground coffee and other powdered products, comprising:
    a storage container having a bottom wall,
    an outlet spout constituting a stationary measuring chamber and formed integrally with said bottom wall and having upper and lower open ends,
    a valve member that is displaceable between a projected and a retracted position and includes upper and lower walls so arranged relative to said spout that said upper wall obstructs said upper end of the spout when the valve member is displaced toward its retracted position while said lower wall in the same situation does not obstruct said lower end of the spout, and
    an agitator means formed integrally with said valve member and placed closely above said bottom wall, wherein said bottom wall is inclined downwardly toward said upper end of the spout, said agitator means being of ladder formation and at one end being connected to said upper wall while at its other end the agitator means rests slidably on said inclined bottom wall.

* * * * *